United States Patent
Gericke et al.

(10) Patent No.: US 6,223,883 B1
(45) Date of Patent: *May 1, 2001

(54) VACUUM CONTROL FOR A TRANSFER DEVICE, IN PARTICULAR FOR CANS

(75) Inventors: Stephan Gericke, Ostfildern; Bernhard Mokler, Markgroningen, both of (DE)

(73) Assignee: LTG Lufttechnische Gesellschaft mit beschrankter Haftung, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/880,107

(22) Filed: Jun. 20, 1997

(30) Foreign Application Priority Data

Jun. 21, 1996 (DE) .................................. 196 24 709

(51) Int. Cl.⁷ ................................................ B65G 47/26
(52) U.S. Cl. ........................................ 198/428; 198/468.4
(58) Field of Search .................................. 198/428, 438, 198/468.4; 414/752

(56) References Cited

U.S. PATENT DOCUMENTS

| 3,496,051 | 2/1970 | Biklen | 156/584 |
|---|---|---|---|
| 4,261,681 | 4/1981 | Gates | 414/744 |
| 4,585,113 | 4/1986 | Greenwell | 198/347 |
| 5,311,978 | 5/1994 | Kroon et al. | 198/428 |
| 5,330,043 | * 7/1994 | Stuckey | 198/468.4 |
| 5,579,893 | 12/1996 | Mokler | 198/430 |

FOREIGN PATENT DOCUMENTS 563461  4/1992  (EP) .

* cited by examiner

*Primary Examiner*—Joseph E. Valenza
(74) *Attorney, Agent, or Firm*—Ostrolenk, Faber, Gerb & Soffen, LLP

(57) ABSTRACT

The invention relates to a transfer device for goods delivered on a first conveyor device, particularly cans, which are transferred in groups, as a row in the direction of conveyance of said first conveyor device, from said first conveyor device to a second conveyor device, the depositing of the goods onto the second conveyor device taking place in the manner that said row extends transverse to its direction of conveyance, having a receiving device which holds the corresponding group of goods upon the transfer and is guided by at least one drive along a path of movement, the receiving device being a suction beam which is connected by a switch device to a source of vacuum, the switch member of which switch device is brought into a vacuum connect position or vacuum disconnect position as a function of the position of the suction beam. It is provided that the switch member (27) is driven by an electric actuator (servomotor M2) which is connected to an electric open-loop control device (22) or electric closed-loop controller which has at least one sensor (S1, S2) which detects the instantaneous position of the suction beam (17).

7 Claims, 3 Drawing Sheets

VACUUM CONTROL FOR A TRANSFER DEVICE, IN PARTICULAR FOR CANS

BACKGROUND OF THE INVENTION

The present invention relates to a transfer device for goods delivered on a first conveyor device, particularly cans, for instance aluminum cans, which are transferred in groups in the direction of conveyance of the first conveyor device, from the first conveyor device to a second conveyor device, the depositing of the goods onto the second conveyor device taking place in the manner that said row extends transverse to its direction of conveyance, having a receiving device which holds the corresponding group of goods upon the transfer and is guided by at least one drive along a path of movement, the receiving device being a suction beam which is connected by a switch device to a source of vacuum, the switch member of which device is brought into vacuum connect or a vacuum disconnect position as a function of the position of the suction beam.

The first conveyor device can, for instance, be a first belt on which the goods are arranged in a row (in particular in one row, or also in two or more rows alongside of each other). The transfer device receives a section, and therefore a group of the goods from this row or each of these rows, and transfers it to the second conveyor device, where the goods are deposited. The depositing is effected with such an alignment of the row or rows that the lengthwise direction of the row or rows is transverse to the direction of conveyance of the second conveyor device. When the second conveyor device for instance also is a belt, then the row of goods extends transverse and particularly perpendicular, to the longitudinal direction of the belt. The goods may, for instance be cans and, in particular beverage cans, which are printed on on their outer side one after the other in a printing machine arranged in front of the first conveyor device and then conducted by the conveyor device to the transfer device. The transfer device rearranges the cans which have been received in groups in such a manner that they are deposited on the second conveyor device in, in each case, rows extending parallel to each other, the lengthwise direction of these rows being transverse to the direction of conveyance of the second conveyor device. In this way, the second conveyor device is provided very compactly with goods which—in the case of the aforementioned cans—are, for instance, fed to a drying device (continuous drying device). The transfer device is so developed that by means of its receiving device it receives goods from the first conveyor device, it moving along in synchronism with the goods during the receiving process so that there is only a slight relative movement, if any, between the goods and the receiving device during the receiving process. This assures a taking over in correct position and therefore a reliable taking over even in the case of high speeds. The same is true of the process of depositing on the second conveyor device. Here also, the receiving device moves in a fixed movement-path region synchronously, or almost synchronously, with the conveyor means of the second conveyor device so that a depositing in precise position is possible without the goods striking against each other or falling over, etc. Since the transfer process must be carried out very rapidly due to the large number of goods delivered, it is necessary to hold the goods very firmly on the receiving device during the transfer process due to the forces of acceleration which occur. For this purpose, the receiving device is developed as a suction beam, that is vacuum holding is employed. The goods are drawn up from above and then transferred. For this, it is not necessary that the receiving device change its vertical position but, rather, it can move in a plane. If it is a slight distance above the upper edges of the cans during the reception, this is sufficient for a suction process. The same applies to the depositing, the depositing process being brought about in the manner that the vacuum is disconnected and in this way the goods are released and deposited onto the second conveyor device.

A transfer device of the type described above can be noted from European Patent Application 0 563 461. This known transfer device has a switch device for the connecting and disconnecting of the vacuum, it being connected to a source of vacuum, the switch member of the switch device being actuated as a function of the position of the suction beam. The switch member is developed as a pusher which is moved back and forth via a crank drive which is coupled to a shaft of the drive means of the transfer device, as a result of which the vacuum is connected and disconnected. By means of corresponding mechanical displacement members, the switching device can be so adjusted upon the placing in operation of the transfer device that the suction action on the goods takes place at the correct time and furthermore the depositing of the goods takes place in the suitable position of the suction beam. Since dead times must be taken into account for the building up of the vacuum as well as for the reduction of the vacuum, and furthermore there is a switch time for the switching device and also other operating parameters exert an influence, the mechanical switch means of the prior art must be developed as so-called phase displacement mechanism since certain operating parameters, such as, for instance, the speed with which the transfer device operates, have an influence on the time delay until the time of production of the suction and the time of depositing of the goods. This means that, upon the starting of the transfer device or upon operation with low speed, a corresponding control of the switch member must take place in order that the goods are properly transferred. If an increase in the operating speed of the transfer device takes place, for instance to the maximum value, then the phase displacement mechanism must also be displaced in corresponding manner. This means an expensive construction which requires adjustments in operation and furthermore needs improvement with respect to its accuracy. Furthermore, the known mechanical displacement upon a transfer to, for instance, other cans always results in the difficulty that not only the phase displacement mechanism but also mechanical couplings to the switch member must be displaced, which requires very expensive adjustment work.

SUMMARY OF THE INVENTION

The object of the present invention therefore is to create a transfer device of the aforementioned type which has a vacuum connection and vacuum disconnection which operate precisely under all operating conditions. Furthermore, a change-over, for instance to a differ type of can, should preferably be possible in very simple manner.

This object is achieved in accordance with the invention in the manner that the switch member is actuated by an electric actuator which is connected to an electric open-loop control device or electric closed-loop control device which has at least one sensor which detects the instantaneous position of the suction beam. As a result of this development, the instantaneous position of the suction beam can be detected precisely by means of the sensor, which reports the detection to the electric open-loop control device or electric closed-loop control device. This, in its turn, effects a processing of the information given it by the sensor, in particular processing with respect to time, in such a manner that the open-loop or closed-loop circuit controls the switch member of the switch device in corresponding manner adapted to the operating parameters, in particular with respect to time. The switch member is developed as an electric actuating member particular as an actuating motor, preferably as servomotor, so that a highly precise solution which is easy to realize is obtained.

It is preferably provided that the sensor be developed as a contact-less sensor. In particular, the sensor scans a machine part of the transfer device which has a movement which corresponds to the operating speed of the transfer device. In particular, the machine part may be a rotating shaft or a rotating wheel which has exposed places which are scanned by the sensor. These exposed places can, for instance, be a mark, a screw head arranged there, or the like. In particular, two sensors which are spaced from each other are provided, one sensor controlling the connecting of the vacuum and the other sensor the disconnecting of the vacuum.

It is furthermore advantageous if the sensor is controlled with a lead time with respect to a given defined position of the suction beam (lead time; phase angle $\psi 1$, $\psi 2$). If—as already described above—a rotating machine part is scanned by the sensor, the lead time corresponds to a given angular offset of the sensor with respect to the position of the mark to be scanned by the sensor, in which the vacuum is built up for the suction action or reduced so that the goods are released.

In particular, it is provided that the lead time is greater than or equal to a maximum delay time between the response of the sensor and the taking over of the goods or the delivery of the goods by the suction beam. This is necessary in order to control the operating condition with maximum delay between response of the sensor and build-up of the vacuum or reduction of the vacuum respectively. This operating condition is present at the maximum speed of the transfer device. If the speed of the transfer device is decreased, then the lead time is to be so transferred that nevertheless an optimum taking over or delivery of the goods is effected. Since the lead times results from an angular offset—as described above—which is constant, the lead time is further processed by electric means in such a manner that there is produced a delay time which—depending on the operating condition—is at most equal to the lead time or less than the lead time, i.e. with increasing speed of the transfer device, the electronic delay between the response of the sensor and the forwarding of this signal is reduced more and more.

In particular, it is provided that the open-loop or closed-loop circuit have an adjustable, preferably electrically operating, lead time processing circuit with which—as already mentioned above—the delay time corresponding to the operating point in question is formed from the lead time as a function of operating parameters, in particular the speed of the transfer device.

BRIEF DESCRIPTION OF THE DRAWINGS

The invention is shown in the drawing on basis of an embodiment.

DETAILED DESCRIPTION OF THE INVENTION

Figure 1:
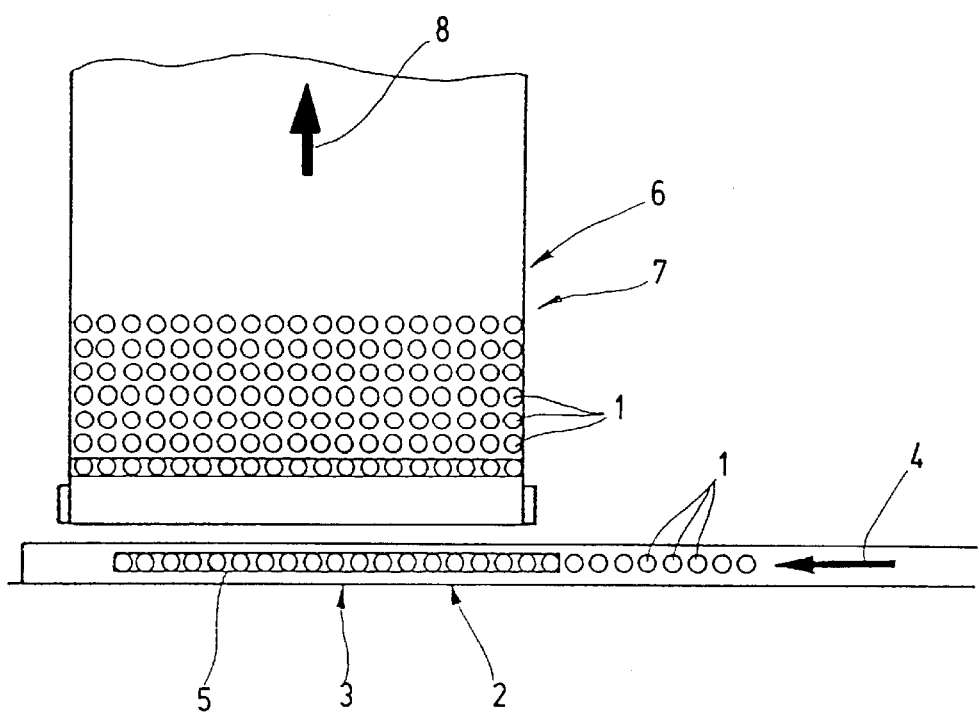
FIG. 1 is a diagrammatic view of a first and a second conveyor device on which goods are arranged.

FIG. 1 is a top view of a transfer region for goods 1, the goods 1 being freshly painted tin cans such as known, for instance in the beverage industry. The goods 1 are delivered in a row on a first conveyor device 2. The first conveyor device 2 is preferably developed as a first belt 3. Therefore the goods 1 are arranged as a row on the belt and are transported in the direction indicated by the arrow 4. The direction of conveyance 4 points in the longitudinal direction of the row of goods 1. By means of a transfer device, not shown in FIG. 1, a group 5 of the goods 2 is grasped and transferred to a second conveyor device 6. The group 5 is indicated by a rectangle in which a corresponding number of goods 1 is contained.

The second conveyor device 6 is also a (second) belt 7, which moves in the direction of the arrow 8. The transfer device *not shown) transfers the group 5 in such a manner that the goods 1 arranged in a row in it are in a row alignment which is transverse, and particularly perpendicular, to the direction of conveyance 8 of the second conveyor device 6. From FIG. 1 it is therefore clear that during the course of the transfer movements, in each case a group transferred by the first conveyor device 2 and deposited on the second conveyor device 6 leads to parallel rows of goods 1 formed there, the width of the belt 6 corresponding more preferably to the length of the group 5 and the transfer process taking place so rapidly and synchronized that in each case just a group 5 of goods 1 is available on the first conveyor device 2 when the previous depositing of a group 5 has been completed, so that the next group 5 is transferred to the second conveyor device 6 in such a manner that the individual rows deposited there are close together—seen in the direction of conveyance 8—but without contact between the individual goods 1. In this way, a very high density of goods 1 can be created on the second conveyor device 6.

Figure 2:
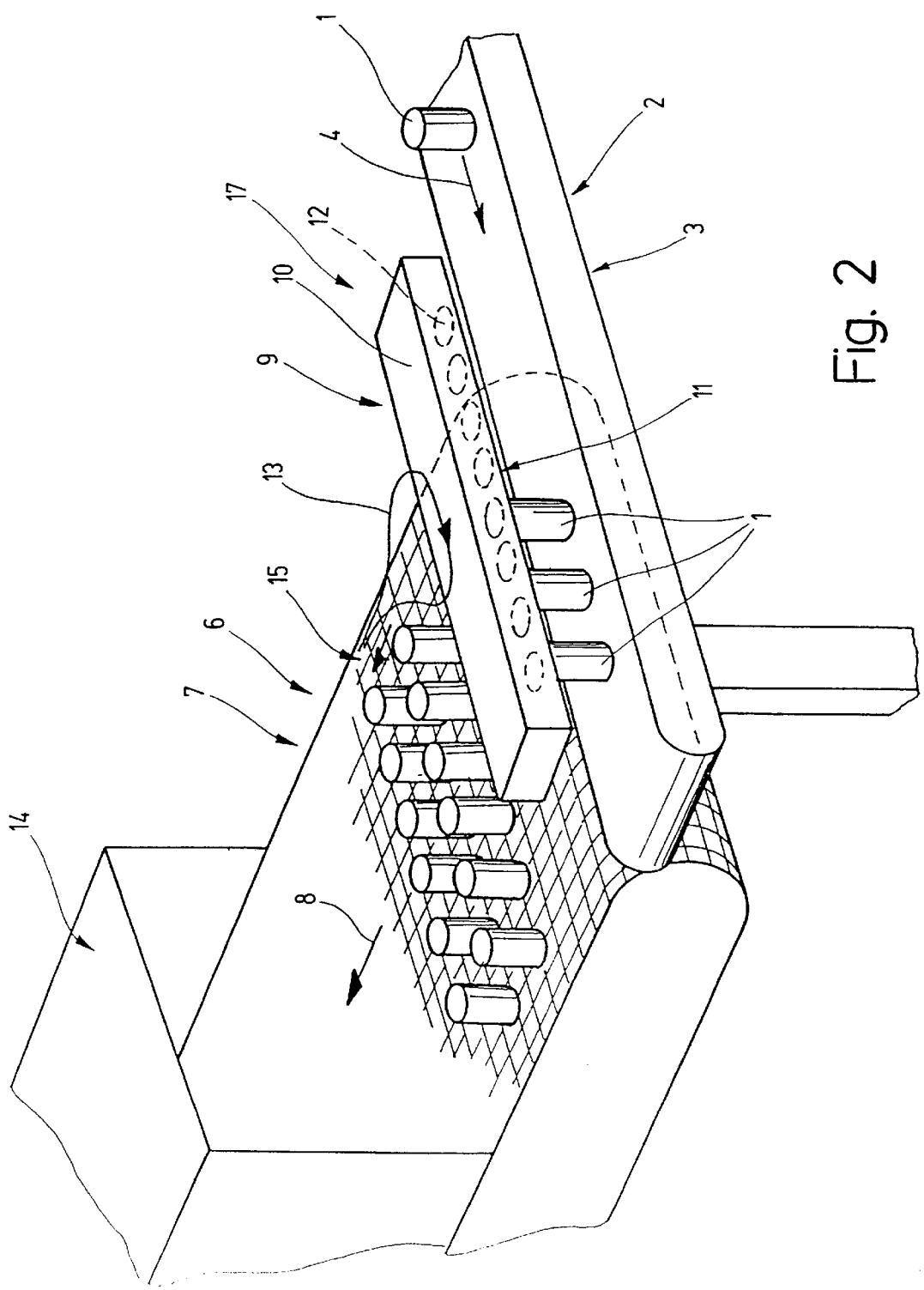
FIG. 2 is a diagrammatic view, in perspective, of the embodiment of FIG. 1.

FIG. 2 explains the above remarks. Here, the transfer device 9 is shown purely diagrammatically. It has a beam-shape receiving device 10 which, on its bottom 11 facing the goods 1, has suction slits 12 which come opposite the goods 1 on the conveyor device 2. In this connection, the transfer device 9 moves in synchronism with the movement of the goods a on the first conveyor device 2 so that there is no relative movement. In this condition, the vacuum in the receiving device 10 is produced, as a result of which the goods 1 are drawn up and held on the lower side 11 of the receiving device 10. During the course of the further operation, the receiving device 10 travels over a curved path 13, i.e. it moves in the direction towards the second conveyor device 6, it thereby assuming a speed which corresponds to the speed of conveyance and the direction of conveyance of the second conveyor device 6. When the receiving device 10 has reached the corresponding position for depositing above the second conveyor device 6, the vacuum is disconnected and the goods 1 released, they then depositing in accordance with their row alignment on the belt 7 and traveling in the direction of the arrow 8 for instance into a drying tunnel. It can be noted from the further course of the curved path 13 that, after the depositing, the receiving device 10 remains stationary for a short time (point 15) and then moves back correspondingly accelerated in order to be able again to receive goods 1 from the first conveyor device 2. The process described is thus repeated cyclically, very high speeds, for instance up to about 1500 cans a minute, being employed. The number of cans which are transferred per minute depends also on the width of the second conveyor device 6.

From the foregoing, it is clear that for a dependable transfer of the goods 1 a precise connecting and disconnecting of the vacuum is necessary. The development of a device which carries out this precise control will be explained with reference to FIG. 3.

Figure 3:
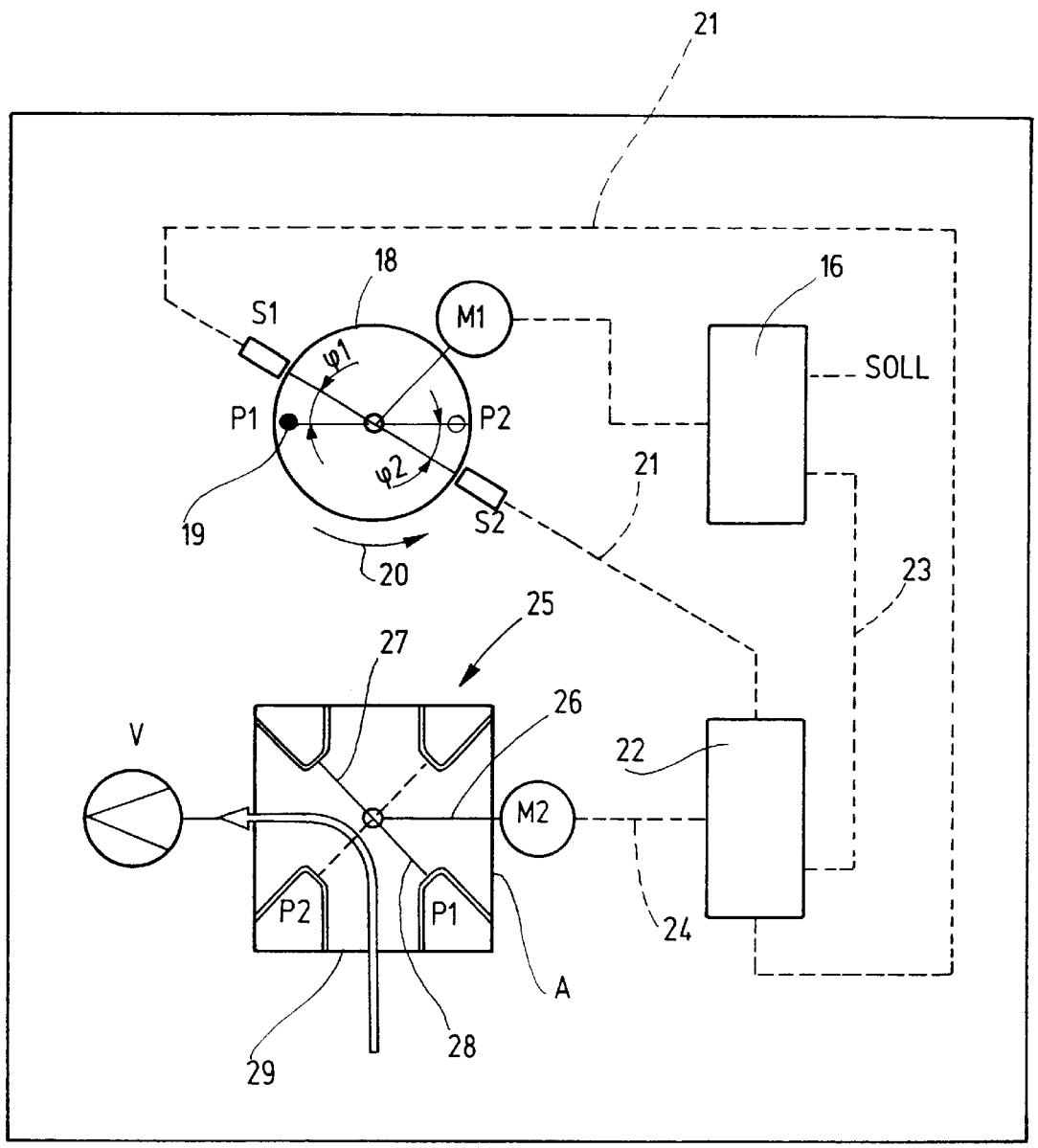
FIG. 3 is a block diagram.

FIG. 3 shows an electric frequency converter 16 to which a desired value SOLL is fed. This desired value SOLL determines the speed with which the transfer device 9 operates. Depending on the desired value SOLL, the frequency converter 16 controls an electric drive motor which drives the different machine parts of the transfer device 9. Among other things, it also actuates the receiving device 10 which is developed as a suction beam 17. The drive motor M1 is coupled, fixed in rotation, to a machine part 18 which is developed, for instance, as a rotating wheel. Near its circumferential edge, the machine part 18 has a mark 19 which can be formed, for instance, by an exposed screw head. The mark 19 rotates (arrow 20) with the machine part 18, the speed of rotation corresponding to the speed of rotation of the drive motor M1 and being thus a measure for the speed of the transfer device 9. On the periphery of the machine part 18—at a slight distance from the latter—there are two sensors S1 and S2 which are arranged preferably approximately diametrically opposite each other. When the machine part 18 rotates, the mark 19 passes by the sensors S1 and S2, as a result of which the latter give off electric signals over electric lines 21 to an electric control device 22. The electric control device 22 can preferably also be developed as electric closed-loop control device, particularly an electric servocontroller. Furthermore, the electric control device 22 receives, via an electric wire 23, the desired value SOLL, which, to this extent, provides the electric control device 22 with information with regard to the instantaneous speed of the transfer device 9. The electric control device 22 controls a switch device 25 via an electric line 24. For this purpose, the electric line 24 is connected with a servomotor M2 the shaft 26 of which is coupled, fixed in rotation, to a switch member 27 of the switch device 25. The switch member 27 is developed as a rotary flap 28. In the position shown in solid line in FIG. 3, the rotary flap 28 connects a suction hose 29, coupled with the suction beam 17, to a source of vacuum V which is developed as fan. Thus, the fan V produces a vacuum so that the suction beam 17 can draw up the goods 1. If the servomotor M2 moves the suction flap 28 into the position shown in dashed line in FIG. 3, then the suction hose 29 is connected to the atmosphere A; in other words the vacuum which was previously present is done away with so that the suction beam no longer exerts a suction action. In this way, the goods which were previously drawn in there are released.

FIG. 3 shows two positions P1 and P2. These positions correspond to given positions of the mark 19 of the machine part 18. It can be noted that—corresponding to the direction of rotation of the arrow 20—the sensors S1 and S2 are arranged leading the positions P1 and P2, by the phase angles $\psi 1$ and $\psi 2$. From the switch device 25 of FIG. 3 it can be noted that the flap positions entered there are also designated by the positions P1 and P2. This means that in the position P1 of the mark 19, the rotary flap 28 assumes the position P1 and thus connects the suction beam 17 with the source of vacuum V. When the mark 19 is in the position P2, this corresponds to the position P2 of the rotary flap 28, i.e. the vacuum is done away with.

Since certain dead times as well as switch times in the operation are to be taken into account, the above-mentioned phase angles $\psi 1$ and $\psi 2$ are provided, which will be described below. The phase angles $\psi 1$ and $\psi 2$ are thus pre-control values, since the sensors S1 and S2 lead the positions P1 and P2. The above-mentioned dead time is the time necessary for the vacuum to develop effectively for the goods 1 on the suction beam 17, since a certain amount of time passes between the response of the sensor, the actuating of the servomotor M2, the displacement of the flap, and the building-up of the vacuum. The same is true with regard to the reduction of the vacuum, i.e. upon response of the sensor S2 the cans held by the suction beam are not released immediately but there are reaction times and, in particular, the vacuum must be removed via the suction hose 29 and the connection to the atmosphere. The structural parts and further factors of influence therefore due to corresponding time delays, exert an influence on the development of the vacuum and the removal of the vacuum. All of this is taken into consideration by means of the phase angles $\psi 1$ and $\psi 2$. The phase angles $\psi 1$ and $\psi 2$ are so established as to provide assurance that, with the longest possible delay times for the building-up of the vacuum effective for the goods and the removal of the vacuum effective for the goods, an optimal suction time and release time can be maintained. This is true, when the transfer device 9 is operating with maximum speed. Thus, the sensor S1 senses the mark 19 at a time which is prior to the actual suction time of the goods 1, i.e. actually drawn up at a time when the machine part 18 has already turned further, namely the mark 19 has assumed the position P1. The same applies with respect to the removal of the vacuum. In this connection, all factors of influence (not only the speed) are taken into account, so that there is a dependence on the relevant operating parameters. The electric control device 22 is now so developed that it electrically/ electronically variably delays the signals coming from the sensors S1 and S2 so that—as a function of the instantaneous operating parameters—at the corresponding time the vacuum is effectively built-up for the goods 1 or effectively removed by suitable actuation of the rotary flap 28. Since with greater speed of the transfer device 9, the electric delay of the electric control device 22 must become smaller and smaller in order for the goods to be taken over or deposited optimally by the suction beam 17, the electric control device 22 assumes a corresponding adjustment, i.e. with increasing operating speed of the transfer device, it controls the servomotor M2 with less delay so that the desired results can be obtained. The information as to what time of delay is to be selected in each case is obtained by the electric control device 22 by the feeding of the desired value SOLL from which it can derive the speed of the transfer device 9. As an alternative, however, it is also possible for the speed to be derived from other variables. The sensor response rate contains, for instance, information as to the actual speed of the transfer device.

By means of the invention, it is possible to effect very simple adjustments upon change of the parameters. If, for instance, cans other than the previous operation which have a different weight are used, then it is necessary to increase the strength of the vacuum. This has the result that the switch times and the times of reception and deposit must be changed. With the known mechanical solution, this is possible only with very great difficulty and with expensive adjustment work. As a result of the invention, an adaptation can be effected very easily electrically without having to take any special measures. The invention furthermore makes a change in speed of the transfer readily possible without any problems arising, since a simple and precise control takes place, which provides reproducible results in view of the electrical control. A change in speed which represents a change in parameter has heretofore led, in the case of the mechanical solution, to one consciously assuming problems upon the starting-up of the device, that is, in that case, the cans were not taken up correctly so that rejects resulted. If an increase in speed was then effected, the adjustments of the machine were directed at this higher speed, i.e. at higher speeds the manner of operation was more or less correct. If the electrical solution of the invention is used, it is possible readily to cover the entire speed range optimally and in reproducible manner, i.e. upon each speed the cans are transferred exactly and precisely, since the control of the vacuum is always adapted to the existing circumstances by a corresponding control of the switch member.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A transfer device for transferring goods from a first conveyor to a second conveyor, the transfer device comprising:

a first conveyor which moves goods to be transferred along a first direction wherein the goods are arrayed on the first conveyor in groups of goods arrayed along the first direction;

a second conveyor which moves transversely to the first conveyor and which receives a group of goods transferred from the first conveyor and that transferred group of goods is in an array transverse to the movement direction of the second conveyor;

a receiving device which removes a group of goods from the first conveyor and transfers those goods to the second conveyor, a drive for moving the receiving device along a path of movement enabling the receiving device to pick up a group of goods from the first conveyor and to deliver the picked up group of goods to the second conveyor;

the receiving device comprising a suction beam movable by the drive over the group of goods so that such suction applied to the suction beam holds the goods of the group to the suction beam;

a switch device including a switch member having a vacuum connect position for connecting the suction beam to a source of vacuum for applying suction to the suction beam and having a vacuum disconnect position which disconnects the suction beam from the source of vacuum;

a rotating machine part; and an electric actuator for the switch device comprising an electric loop control device connected to the switch device for operating the switch member, the loop control device has a first sensor for detecting at least a first instantaneous position of a mark on the machine part such that upon detection of the mark at the first instantaneous position, the loop control device operates the switch member to the vacuum connect position at a selected first time interval before the suction beam has moved to a position at the first conveyor where the suction beam is to hold the group of goods, the first sensor detecting the first instantaneous position of the mark so as to provide a first lead time period for sufficient vacuum to be delivered to the beam to hold the goods, and the control device being operable to adjust the first time interval within the first lead time period as a function of an operating speed of the transfer device and a second sensor for detecting a second instantaneous position of the mark on the machine part, such that upon detection of the mark at the second position, the loop control device operates the switch to the vacuum disconnect position at a selected second time interval before the suction beam has moved to a position at the second conveyor so as to provide a second lead time for the vacuum in the beam to reduce to release the goods, and the control device being operable to adjust the second time interval within the second lead time period as a function of an operating steed of the transfer device.

2. A transfer device according to claim 1, wherein the sensors are contact-less sensors.

3. A transfer device of claim 1, wherein the control device has an adjustable operating lead-time processing circuit by which the lead times applicable for the instantaneous positions of the mark to allow for sufficient build-up and release of vacuum are formed as a function of operating parameters.

4. A transfer device according to claim 3, wherein each lead time is greater than or equal to a maximum delay time between the response of the respective sensor and the suction function or the release function on the goods by the suction.

5. A transfer device according to claim 1, wherein the motor is formed as a servomotor.

6. A transfer device according to claim 1, further comprising a line for feeding a desired transfer device speed value as an operating parameter to the control device.

7. A transfer device according to claim 1, wherein the rotary flap is rotated 180° by the motor between a vacuum position and a release position.

* * * * *